United States Patent [11] 3,630,755

[72] Inventors Robert F. Schiffmann
  Brooklyn;
  Ernest W. Stein, New York; Harold B.
  Kaufman, Jr., New York, all of N.Y.
[21] Appl. No. 51,458
[22] Filed July 1, 1970
[45] Patented Dec. 28, 1971
[73] Assignee DCA Food Industries, Inc.
  New York, N.Y.
  Continuation-in-part of application Ser. No.
  649,610, June 28, 1967, now abandoned.
  This application July 1, 1970, Ser. No.
  51,458

[54] DOUGH PROOFING METHOD
  30 Claims, 3 Drawing Figs.
[52] U.S. Cl. .................................................... 99/90 R,
  99/86, 99/92, 99/94
[51] Int. Cl. .................................................... A21d 8/02
[50] Field of Search ........................................ 99/86, 90
  R, 90 CB, 92

[56] References Cited
UNITED STATES PATENTS
| 2,413,003 | 12/1946 | Sherman | 99/90 X |
| 3,424,590 | 1/1969 | Booras | 99/90 |
| 3,479,188 | 11/1969 | Thelan | 99/86 |

Primary Examiner—Raymond N. Jones
Assistant Examiner—James R. Hoffman
Attorney—Amster & Rothstein ABSTRACT: A method for proofing cut pieces of yeast-containing dough. The dough pieces are subjected to at least two microwave heating periods separated by a "rest" period. Typically, the dough pieces are first heated for a period of 5 to 180 seconds to raise the dough temperature to between 90° and 120° F. Heating of the dough pieces is then stopped for 20–180 seconds to permit temperature equilibration. Thereafter, the dough pieces are heated again for a period not exceeding 3 minutes to a temperature between 100° and 130° F. During both heating intervals, the power density within the dough pieces is in the range 0.089–9.7 watts/g. Such a sequence allows the dough pieces to uniformly rise to an optimum volume in a relatively short time.

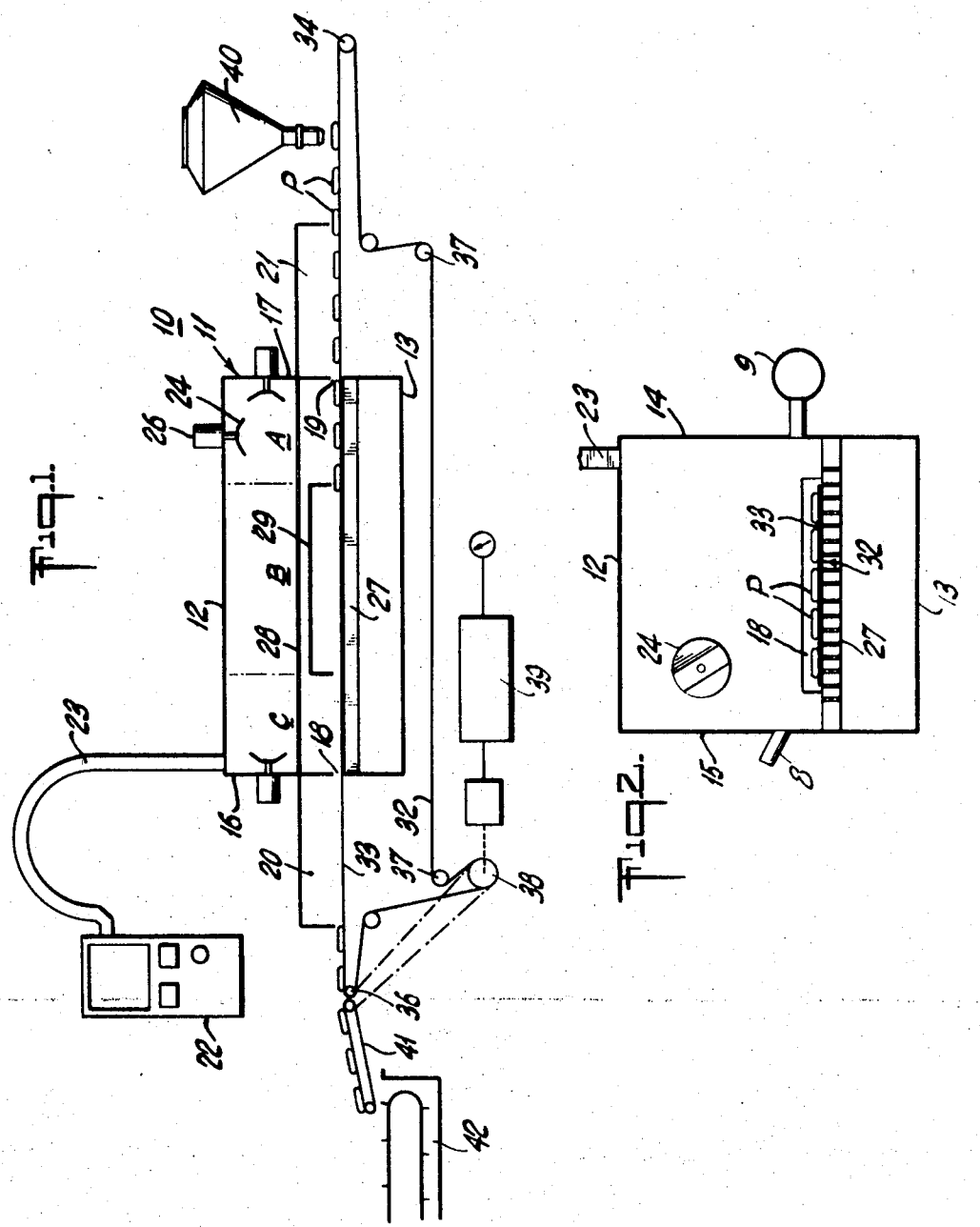

DOUGH PROOFING METHOD

This application is a continuation-in-part of application, Ser. No. 649,610 filed on June 28, 1967 now abandoned.

This invention relates to methods for the production of baked products, and more particularly to methods for proofing yeast-leavened dough.

In the production of yeast-raised bakery products, as typified by yeast-raised doughnuts, a yeast-containing dough mass of suitable composition is worked by kneading at room temperature to develop the gluten to an optimum viable state. The mass then is divided or extruded into pieces of the desired shape and size. The pieces of dough are stored under closely controlled ambient conditions of temperature and humidity for a period of the order of about 15 to 75 minutes to cause the desired raising of the dough as a consequence of the generation and expansion of gases in the dough due to the yeast and enzymatic activity, and to produce other desired effects such as maturing of the gluten and formation of a uniform skin (all hereinafter referred to when the term "gassing" is used). In large commercial operations the production of the baked product is achieved in a continuous manner and the proofing is accomplished by depositing groups of the dough pieces onto consecutive trays and transporting the successive trays through a proofing chamber or cabinet maintained under controlled conditions of temperature and humidity.

This procedure possesses many drawbacks and disadvantages. By reason of the long storage time required to effect the desired raising of the dough, the equipment is bulky, awkward, expensive and occupies large amounts of space, and the amount of in-process product in the proofing area is great so that any malfunctioning of the equipment, any processing or composition error, or any misadjustments may adversely affect the quality of large quantities of product.

Thus, the conventional continuous proofing equipment and the required accessory devices are expensive, of little versatility and adaptability and subject to malfunctioning, and the procedures employed with such equipment are highly inflexible, and frequently result in products of inferior quality.

In conventional proofing, the dough pieces are placed in a proofing box whose temperature is approximately 130° F. The ambient temperature causes the dough temperature to rise and the yeast to start gassing. Since the rise in dough temperature results from heat conduction only, the process is relatively slow. Furthermore, the ambient temperature which is most suitable for the dough is under 130° F.; too high a temperature dries out the skin.

To overcome the aforesaid problems, it has been proposed in the prior art to accelerate the proofing by subjecting the dough pieces to a microwave field. The dough temperature rises at a fast rate in the microwave oven and there is rapid gassing of the yeast. But such prior art approaches have not been successful. The primary shortcomings were that it was observed at the end of the proofing process that there had been insufficient gassing (the dough pieces were not completely proofed), and "hot spots" were evident in the dough pieces (certain regions of the dough pieces were in effect partially baked relative to other regions and resulted in a nonuniform product after the final frying or baking step).

It is a principal object of the present invention to provide an improved method for the production of baked goods.

Another object of the present invention is to provide an improved method for the production of yeast-raised dough.

Still another object of the present invention is to provide an improved method for the continuous raising of yeast-containing pieces of dough attendant the continuous production of baked and fried products.

A further object of the present invention is to provide an improved method for the continuous raising of yeast-containing dough pieces characterized by extremely short processing time, and uniformity and high quality of the resulting raised dough.

The method of our invention produces a raised dough by first exposing a yeast-containing dough to a high-frequency field (preferably, microwave) for a first period of 5 to 180 seconds at a power density, as measured in terms of the heating of "conductivity water," in the range 0.128–12.4 watts/g. to raise the temperature of the dough to between 90° and 120° F., and then maintaining the dough for a second period of 20 to 180 seconds at a temperature between 90° and 120° F. The dough is then once again subjected to a microwave field having a power density in the same range for a third period not in excess of 180 seconds. Preferably, all of the microwave heating (during the first and third intervals) takes place in a microwave oven in which the ambient temperature is in the order of 100°–130° F. The ambient temperature insures the proper formation of a gas-retaining skin on the proofed dough.

The initial microwave heating of the dough rapidly raises its temperature to a level at which appreciable gassing of the yeast can take place. During the first heating interval, the power density of the microwave field can be even higher than some of the prior art microwave fields which were used to accelerate proofing. Even though these prior art fields (of even lower power densities) resulted in final products of nonuniform texture, this problem does not exist in the practice of our invention because the temperature of the dough is not raised to the final proofing temperature during the first step. The temperature is raised only to a level at which rapid proofing can begin.

During the second interval, when the microwave power is turned off, the dough is maintained at a temperature at which relatively fast gassing can take place. During this "rest" interval, the temperature of the dough equilibrates. At the end of the first heating interval, different regions of the dough are at different temperatures. During the rest interval, the various temperatures of the different regions of the dough come closer together. Thus not only does relatively fast proofing continue to take place during the rest period, but the dough temperature is made more uniform as well.

During the second microwave interval, the dough temperature rises rapidly to the final proofing temperature. This permits the complete proofing of the dough (frying or baking can begin immediately) as even more gas is generated by the yeast. Once again, the power density of the microwave field can be even higher than those levels which in the prior art microwave proofing gave rise to final products of nonuniform texture. It is true that during the final heating interval the various regions of the dough are raised to different temperatures. However, because at the end of the rest interval all regions of the dough were at more or less the same temperature, the relatively small rise from this temperature to the final temperature does not result in large enough deviations in temperature within the dough to produce any hot zones or partially baked zones.

It has been discovered that the developed yeast-containing dough treated in the above manner rapidly reaches a highly desirable raised state in a total microwave heating and intermediate rest period in the order of 25 to 360 seconds, in which state it is ready for baking.

The principles of our invention can be understood with reference to the illustrative apparatus for practicing the proofing method. The apparatus includes an endless conveyor belt. A dough piece forming and severing apparatus is located at the trailing end of the conveyor and operates to deposit regularly spaced rows of dough pieces onto the conveyor. Zones of a high-frequency microwave field are established at the trailing end of the conveyor forward of the dough piece depositing station and adjacent to the discharge end of the conveyor, the leading and trailing field zones being separated by a substantially field-free zone, the field-free zone being held at a temperature approximately equal to the final proofing temperature. The field forming equipment may include a cavity extending along the length of the conveyor upper run and connected by a waveguide to a microwave generator. Tunnels defining microwave radiation attenuation traps afford passage of the belt through the cavity, and the field-free zone is achieved by positioning a shield-defining low metal tunnel along the conveyor run between the inner boundaries of the microwave field zones.

The dough treated by the method of our invention advantageously contains a maturing agent in an amount of between 10 and 250 parts per million based on the weight of the flour. In addition, the dough advantageously contains a bromate, for example, potassium bromate, in an amount between 1 and 150 parts per million and a proteolytic enzyme in known and conventional concentrations, which may be introduced as inactive dry yeast. A dry mix containing the flour and maturing agent, and preferably the bromate and enzyme, is admixed with the other ingredients to form the dough, including the yeast, water and preferably sugar, shortening and additives such as flavoring, egg solids, milk solids and the like.

Further objects, features and advantages of our invention will become apparent upon consideration of the following detailed description in conjunction with the drawing, wherein:

FIG. 1 is a diagrammatic longitudinal sectional view of an illustrative apparatus for practicing the method of our invention;

FIG. 2 is a transverse sectional view of the apparatus of FIG. 1; and example—doughnuts—

Figure 3:
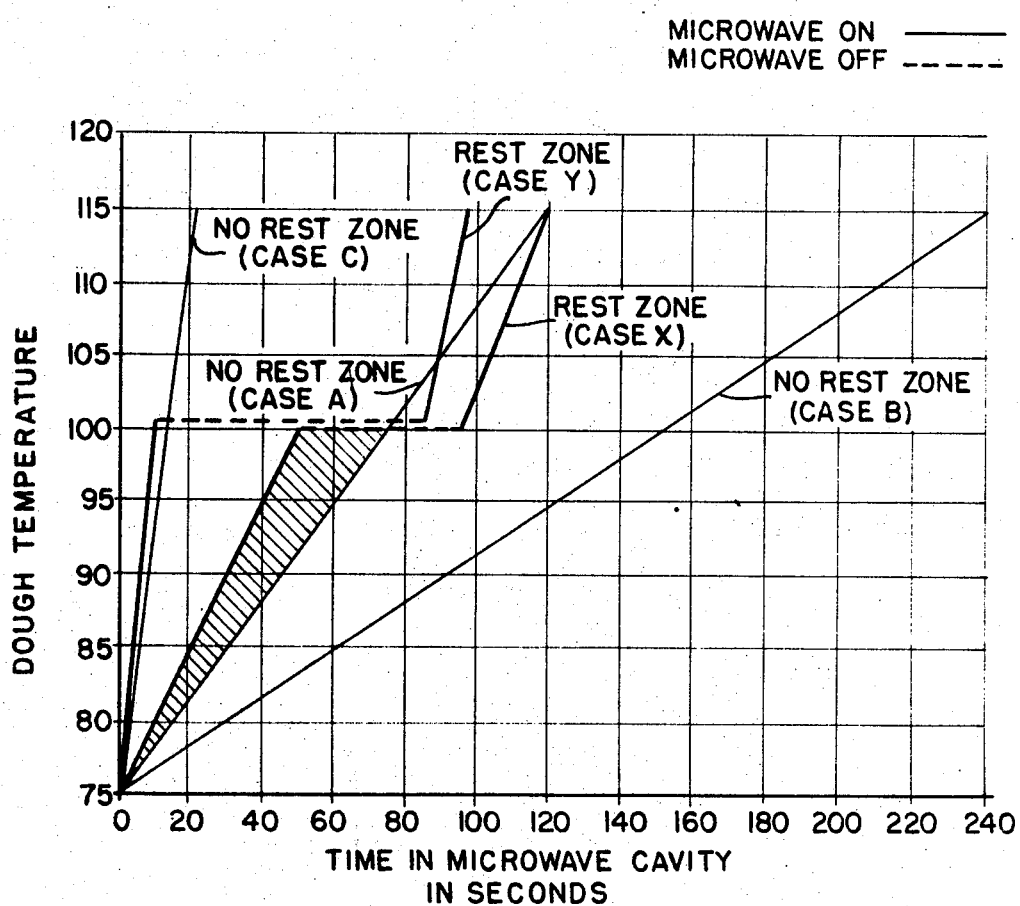
FIG. 3 is a plot of average dough temperature versus time for a typical example —doughnuts —and will be helpful in understanding the principles of our invention.

Referring to FIGS. 1 and 2, reference numeral 10 generally designates the apparatus which comprises a cavity-defining metal chamber 11 including top and bottom horizontal rectangular walls 12 and 13 respectively, rectangular longitudinally extending vertical sidewalls 14 and 15, and leading or front and trailing or rear transversely extending vertical rectangular end walls 16 and 17 respectively. Formed in the front and rear end walls 16 and 17 are horizontal outlets and inlet slots 18 and 19 of a height and width sufficient to permit the passage of a belt conveyor loaded with dough pieces to be treated. In order to attenuate the microwave radiation leaking from the cavity 11 through slots 18 and 19 to a permissible level there are provided elongated radiation attenuation metal tunnels 20 and 21 which extend longitudinally outwardly from end walls 16 and 17 in registering alignment with slots 18 and 19 of dimensions to permit passage of dough pieces of the desired size and to attenuate sufficiently radiation from cavity 11.

A high-frequency generator 22 has its output coupled in any suitable manner to the upper part of cavity 11 as by means of a connecting waveguide 23. The frequency of the output of generator 22 is in the range between 1 and 100,000 megacycles, for example, 2,450 megacycles, and the generator is provided with controls for adjusting the power output. Preferably, the oven is operated in the microwave frequency range. A plurality of mode disturbers 24 of known construction are positioned throughout cavity 11 and are rotated by corresponding externally mounted motors 26 to change the wave patterns within cavity 11.

Extending between the bottom edges of slots 18 and 19 are a plurality of suitably supported laterally spaced longitudinally extending parallel slats 27 of low loss dielectric material, for example, polystyrene or the like. A rectangular horizontal panel 28, likewise formed of a low loss dielectric material, is supported in cavity 11 at a short distance above the upper edges of slots 18 and 19 and is substantially coextensive with the cavity walls. Panel 28 restricts the volume of the passageway through the cavity 11 containing the atmosphere therein and facilitating maintenance and sanitary conditions without interfering with the high-frequency electric field.

In order to establish a field-free zone within cavity 11 a longitudinally extending metal tunnel 29 is positioned on slats 27 between and spaced from end walls 16 and 17 and in longitudinal alignment with slots 18 and 19 and having a passageway of a transverse cross section corresponding to the shape of slots 18 and 19. Tunnel 29 is preferably of adjustable length and longitudinally adjustable and divides the path through the cavity into a rear high-frequency heating zone A, an intermediate substantially field-free zone B, and a front high-frequency heating zone C, the zones being of adjustable length. It should be noted that there is some leakage of the high-frequency field into zone B but this is of a relatively low intensity and effects little or no heating in zone B. If desired, tunnel 29 may be adjusted in dimensions to permit sufficient field therein to effect a reduced predetermined heating of the dough conveyed therethrough. Tunnel 29 is formed of jacketed walls containing water or other energy absorbing material (as is described more fully in our corresponding application, Ser. No. 51,531, filed on July 1, 1970. A conveyor belt 32 includes an upper run 33 which advances from an upper rear drum 34 trailing tunnel 21, through tunnels 21, 29, and 20 along the bottom walls thereof, and along the upper faces of slats 27 in zones A, B and C to a leading drum 36 forward of tunnel 20, belt 32 being substantially the width of the tunnels. In its return run, belt 32 traverses a path external of cavity 11 about a plurality of guide rolls 37 and about the periphery of a drive drum 38. Drum 38 is connected to a variable speed drive motor 39 which effects the advance of belt 32 along its upper run 33 at an adjustable speed. Belt 32 is formed of a porous woven web and may be formed of other materials, for example, Teflon coated woven cotton, glass fibers, or the like. An environmental control system, represented by the numeral 9, maintains the oven at the proper temperature (100°–130° F.) and humidity (50–90 percent) levels. The dough pieces inside the oven can be observed through viewing ports 8.

A dough extruding and cutting device 40 of known construction for cutting doughnut shaped pieces of dough is positioned above the trailing section of the belt run 33 and may be of the type described in U.S. Pat. No. 3,152,560, granted Oct. 30, 1964. The device 40 may be provided with a plurality of laterally spaced extrusion and cutter heads and may be transversely reciprocated. Belt 32 may be intermittently advanced and synchronized with the device 40 so as to deposit successive equally spaced transverse rows of dough pieces P on the belt upper run 33. At the leading end of belt upper run 33 there is provided a downwardly forwardly inclined endless conveyor 41 which extends from a point adjacent the leading end of conveyor run 33 to the trailing end of continuous deep frying unit 42 which may be of the construction described in U.S. Pat. No. 2,709,995, granted June 7, 1955. Conveyor 41 is synchronously driven with conveyor 32 and transfers dough pieces P discharged from the leading end of conveyor run 33 to frier unit 42.

In the operation of the apparatus, the speed of belt 32, the power output of generator 22 and the length and position of tunnel 29 are adjusted to achieve the operating conditions and parameters earlier set forth. These adjustments depend on the rate of treatment, the dough composition and other variables (such as total dough weight in the oven), and the proper adjustments may be easily and readily determined and effected.

Dough treated in the apparatus of FIGS. 1 and 2 advantageously contains a maturing agent and is advantageously produced from a dry mix comprising flour containing between 10 and 250 parts per million of a maturing agent, preferably azodicarbonamide, although other known agents may be employed. The dry mix also advantageously contains 1 to 150 parts per million of a bromate, for example, potassium bromate, and the like. In the production of yeast raised doughnuts, the dry mix may contain 2 to 12 parts sugar, 60 to 85 parts flour, 2 to 10 parts shortening, 1 to 3 parts milk solids, one-fourth to 2½ parts salt, egg solids, and other additives including the maturing agent, bromate, and enzymes. In producing the dough the dry mix is admixed with 50 percent water, based on weight of dry mix, and is worked in the known manner to develop the gluten or dough, the optimum amount and the developed dough is loaded into device 40 where it is extruded and cut into dough pieces P.

The following is a specific example of a dry mix which may be employed in the production of yeast raised doughnuts:

| Ingredient | Parts |
| --- | --- |

| | |
|---|---|
| Flour (wheat) | 76 |
| Sugar | 7 |
| Shortening | 6.5 |
| Dry Egg Yolk | 2 |
| Salt | 1.25 |
| Nonfat Dry Milk | 2 |
| Emulsifier | 2 |
| Baking Powder | 2 |
| Potassium Bromate | 70 p.p.m.* |
| Maturing Agent | 100 p.p.m.* |
| Defatted Soya Flour | 1.25 |
| Inactive Dry Yeast | 0.001 |

* Based on weight of flour, parts per million (p.p.m.)

In accordance with a specific construction of apparatus 10, cavity 11 is 79 inches long, 35 inches wide, and 35½ inches high. Tunnels 20 and 21 are 2 inches high and 35 inches wide, and tunnel 29 is 2 inches high and 28 inches wide and the belt run 33 is positioned 11⅞ inches above the cavity bottom wall 13. The tunnel 29 is adjusted to make zones A, B, and C, 25 inches, 41 inches, and 13 inches long respectively, it being noted that zones A, B and C are advantageously adjustable respectively between 10 and 40 inches, 10 and 60 inches, and 10 and 40 inches.

The following example is given by way of illustration:

A dough is prepared by mixing 30 pounds of the dry mix specified above with 15 pounds water and 2 pounds compressed yeast, the dough being worked by a planetary mixer for a period of 12 minutes to develop the gluten in the known manner. The dough is loaded in the hopper of the extruding and cutting device 40 and motor 39 is energized to drive belt 32 at a speed of about 0.70 inches per second. Successive rows of toroidal dough pieces P are deposited in the belt run 33, the dough pieces weighing 1⅛ ounces each, arranged two on a row, the center to center distance between successive rows being 4 inches. Generator 22 produces a field of a frequency of 2,450 megacycles per second and is adjusted to a power output of 1.5 kilowatts. The dough pieces are conveyed through zone A where they are exposed to the high-frequency field for a period of about 35 seconds, traverse the substantially field-free zone B for a period of about 58 seconds, and are then exposed to the high-frequency field in zone C for a period of about 17 seconds. The temperature of the dough pieces entering zone A is about 80° F. and leaving zone A and entering zone B their temperature is about 100° F.; the dough pieces P leave zone B and enter zone C at a temperature of about 100° F., and leave zone C in a substantially fully raised condition at a temperature of about 120° F. The raised dough is discharged from conveyor belt 32 onto conveyor 41 and then into frier 42, the time between zone C and the frier being about 90 seconds (due to conveyor delay) and the temperature of the dough pieces as they reach frier 42 is about 120° F.

The dough pieces P when they reach frier 42 are uniformly expanded to optimum volume with a smooth nonporous skin and in all appearances resemble conventionally proofed dough pieces, and the fried cakes or end product are of large volume (160–190 cc.), low density (0.25 to 0.20 g./cc.) having a smooth golden-brown crust and white midline, and an even celled interior structure.

Heating the dough in this manner greatly shortens the proofing time. The reason for the field-free or rest zone is that in the first heating zone the dough pieces heat unevenly; the intermediate rest zone allows the temperature of each dough piece to equilibrate. The microwave input to the rest zone is low enough and the rest period is long enough to allow the temperature of each dough piece to become uniform to the point where the maximum temperature at any point in a dough piece at the end of the rest period is less than 20 percent greater than the average temperature; preferably, the maximum temperature at any point is no more than 5 percent greater than the average temperature. Similarly, the minimum temperature at any point in a dough piece is less than the average temperature by no more than 20 percent, and preferably is less than the average temperature by no more than 5 percent.

While the temperature deviations in any dough piece when it leaves the first heating zone may be much greater than 20 percent, the deviations are greatly reduced by the time the dough leaves the rest zone. The reason for allowing the temperature of each dough piece to become more uniform in the rest zone after the first heating period is that a widely varying temperature within any dough piece would give rise to a nonuniform density of the finished product; the different parts of the dough piece would expand to different extents during the subsequent heating of the dough piece in the last phase of the proofing and during frying.

The advantages of providing rest zones can be understood only after the proofing process itself is considered in detail. FIG. 3 which illustrates several proofing sequences will be helpful in this regard.

In the microwave proofing of yeast raised dough pieces, highly satisfactory results are obtained by keeping the power input to the dough at fairly low levels. Although it is possible to raise the dough temperature to the final proofing temperature in just a few seconds, the resulting product exhibits several severe drawbacks: nonuniformity of dough temperature thereby leading to partially baked areas next to cool areas (further leading to nonuniformly expanded finished products); incompleteness of gas generation since the rise in temperature is faster than the metabolic rate at which yeast generates carbon dioxide; incompleteness of maturation of gluten, also due to improper kinetics; and incompleteness of skin formation on the dough piece, thereby not enabling the shaped piece to retain all of its gas and arrive at a maximum volume.

For these reasons, lower microwave power densities and longer proofing times appear necessary. However, high power densities can be used, thereby shortening the proofing time, in accordance with the principles of our invention by providing rest zones. During the period of interruption (i.e., rest period), the dough experiences either no field at all or only an extremely weak field so as to maintain its average temperature or allow it to increase by only a very few percent. The purpose of this rest period is to allow all nonuniformities in the dough temperature to equilibrate to a medium temperature and to allow all the chemical and physical reactions which occur in proofing to take place at a higher temperature which is kinetically more favorable to the proofing process. This is of great significance since it allows the total proofing time to be shorter than that which would result by any technique which employs continuous exposure to a microwave field followed by immediate baking or frying. Reference to FIG. 3 will make this clear.

The use of a rest zone as in "case X" allows the dough to see initially a higher and more favorable thermal profile than in the "no rest zone, case A" situation in which the same total proofing time is experienced. The improved thermal profile is emphasized by the shaded area which shows higher temperatures reached earlier for the rest zone case. "No rest zone, case B" (low power) demonstrates the much longer period of microwave exposure required in order to obtain the proofing quality equivalent to "rest zone, case X." A proofer for case B is relatively costly in terms of hardware and floor space since it must generally be twice as long as a proofer employing the rest zone of case X.

"No rest zone, case C" shows that it is possible to achieve the final proofing temperature very rapidly using high power density. However, the resulting product is highly unsatisfactory as mentioned above. This case is an example of the prior art techniques.

In the "rest zone, case X" example, successful proofing is achieved using high power densities, higher in fact than in the "no rest zone, case C" situation. However, an important difference exists, namely, that the product is removed from the high-frequency field before any portion of the dough has reached a temperature at which either yeast is killed or flour protein is denatured (i.e., temperatures are maintained at or below 130° F., with the average temperature closer to 100° to 110° F.). The rest period allows the temperature to equilibrate and all the proofing reactions to take place. It is to be noted, however, that the large thermal gradients created in the dough by such fast initial heating make it necessary to extend the rest zone period to almost twice that in the "rest zone, case X" example since longer equilibration time will be required and also because virtually none of the proofing reactions will have occurred in the initial heating period and must occur in the rest period. Equipment for proofing as shown by the "rest zone, case Y" example is more costly in its power generator and has much more nonhigh-frequency field "dead space" than equipment for proofing in accordance with "rest zone, case X."

A further advantage is to be gained from the use of equipment for proofing in accordance with the method represented by "rest zone, case X" rather than either "no rest zone, case C" or "rest zone, case X," especially where the equipment employs a continuously moving conveyor. In the first case the high frequency cavity, if it is a resonant multimode or traveling waveguide-type structure, will be larger than in the latter two cases. This is an important difference since it is much easier to provide heating uniformity over the entire high-frequency product zone where the cavity is large than where it is small. It is of course important that such uniformity be experienced by all shaped dough pieces in the high-frequency field.

The power densities experienced during the proofing process may be expressed in several different fashions, each of which has its advantages in describing the process or apparatus for carrying it out. In a description of the apparatus it is advantageous to discuss power density in terms of the power required to heat a unit volume or unit weight of "conductivity water" (this is water which either through special distillation procedures, or ion-exchange resin techniques, has been reduced in ion content to a specific conductance of the order of $1 \times 10^{-6}$ ohm$^{-1}$ cm.$^{-1}$ or less), since such water is a standard material whose dielectric properties are well known. Reference may be made to "Dielectric Materials and Applications" by A. R. Von Hippel, M.I.T. Press, 1954, which lists the dielectric constant and loss tangent for conductivity water over a wide range of frequencies and temperatures. Once the power density required to heat this standard material is known, it is possible for one skilled in the art to determine the field strength required in the high-frequency apparatus to provide the necessary power density at any frequency by employing the following relationship:

$$P/V = D^2 K (\tan \delta) \, 2\pi f e_o \quad (1)$$

where $P$ = power generated in conductivity water $V$ = volume of conductivity water $E$ = field strength $K$ = relative dielectric constant of conductivity water tan $\delta$ = loss tangent of conductivity water $f$ = frequency of the high-frequency generator $e_o$ = dielectric constant of air $(10^{116} \text{ fared}) / (36 \pi \text{meter})$ The processing time is the total time during which conductivity water would experience the high frequency field during the normal operation of the apparatus as a proofer. This time (exclusive of rest zones) may be given in a broad range as 25–360 seconds, with a preferred range of 60–240 seconds. Similarly, the desired temperature rise in the water would be from 20° to 60° F., (11.1° to 33.3° C.) in the broad range and 30° to 40° F. (16.7° to 22.2° C.) in the preferred range. The power densities in these cases are as follows:

| | |
|---|---|
| broad range: | 0.128–12.4 watts/g. |
| preferred range: | 0.293–1.55 watts/g. |

The field strength required in the conductivity water can be computed from equation (1) for any particular frequency. At the S-band microwave frequency of 2,450 megahertz, for example, the field strengths in the conductivity water are:

| | | |
|---|---|---|
| broad range: | $(3.4 \times 10^2)$–$(3.0 \times 10^3)$ | volts/meter. |
| preferred range: | $(4.6 \times 10^2)$–$(1.1 \times 10^3)$ | volts/meter. |

One can also estimate the field strength in the air surrounding the water by standard techniques utilizing correction for the geometry of the heating mass, as described for example in Page and Adams, "Principles of Electricity." If the sample geometry chosen is that of a cylinder whose axis is approximately as long as its diameter, as would be experienced in a standard Pyrex beaker, then the field strength in air would be computed as follows:

$$e_{air} = \frac{K+2}{3} e_{water} \quad (2)$$

where K is the dielectric constant of water.
This leads to field strengths in air of:

| | | |
|---|---|---|
| broad range: | $(8.4 \times 10^3)$–$(7.4 \times 10^4)$ | volts/meter. |
| preferred range: | $(11.3 \times 10^3)$–$(2.6 \times 10^4)$ | volts/meter. |

By restricting the field strength in air in the high-frequency heating device to those ranges given above, and employing periods of exposure to the high-frequency field and one or more rest periods of the proper durations, excellent proofing results are obtained.

It should be noted that the use of high relative humidities during proofing, as well as an elevated ambient temperature close to that of the final temperature of the proofed material, limits evaporation to very low levels; there is then very little heat loss due to evaporation.

A similar analysis may be employed to establish the requirements of the proofing apparatus at any other frequency. As is known in the art, too low a frequency is undesirable because the field strength must be so large that it can cause arcing or corona discharge in the air or the material to be heated; too high a frequency results in the penetration depth being small by comparison to product size. Although standard microwave oven frequencies have been used successfully, it is to be expected that a broad range of frequencies can be used depending on the particular product.

Rather than to consider power densities in a standard material such as conductivity water, it is possible to consider the power densities in the material to be processed itself, i.e., yeast leavened dough. In this case, yeast leavened dough does not exist as a universally standard material and any change to its ingredient makeup will affect its dielectric properties as well as its thermal and all other physical and chemical properties to some extent. Fortunately, however, most of the effects are small; it is thus possible to delineate the parameters to achieve the required power densities in the dough within the proper time periods. Once again use may be made of equation (1) above in order to establish the field strengths required; but the calculations become far more complicated since the relative dielectric constant and loss tangent are dependent upon frequency as well as temperature of the dough, and no data exists in the literature for these values over a wide spectrum of frequency.

However, experiments reveal that reasonable average values for yeast leavened dough are as follows: specific heat $= 0.7$ calories/g. °C., density $= 0.59$ g./cc. Using these values, the following power density (in the product) ranges can be computed from experimentally observed temperature rises:

| | |
|---|---|
| broad range: | 0.089–9.7 watts/g. |
| preferred range: | 0.202–1.08 watts/g. |

The lower limit in the broad range results in slow heating of the dough. If the power density in the dough is this low value, only a very short rest period is required. The temperature-time curve is approximately that of "no rest zone, case B" in FIG. 10. The higher limit in the broad range results in a temperature-time curve as shown by "rest zone, case Y" in FIG. 10. The use of a higher power density can produce "hot spots" in the dough (resulting in a nonuniform baked product); the use of a lower power density is wasteful of time.

Using the above data, and values of $K = 36$, tan $\delta = 0.07$, equation (1) may be utilized to determine the field strength within the dough at a typical S-band microwave frequency of 2,450 megahertz:

broad range: 38.2 –1,220 volts/meter.
preferred range: 182–421 volts/meter.

The required field strength at other frequencies may be calculated similarly with the use of equation (1) and the correct values of $K$ and tan $\delta$.

It has been found that finished products (after baking or frying) which have been proofed in accordance with the principles of our invention have densities which are the same, and sometimes even lower, than those of similar products proofed conventionally. This, of course, is necessary for a light and fluffy product.

The ambient conditions during proofing should be as follows:

relative humidity;
    broad range: 50–90%
    preferred range: 60–80 %
temperature:
    broad range: 100°–130° F.
    preferred range: 105°–120° F.

The temperature should be comparable to the final proofing temperature in order to aid in the proper formation of a gas retaining elastic skin upon the shaped piece during proofing. It has also been found that these conditions limit the evaporative loss of water from the product so that whereas in conventional proofing between 3 and 10 percent of the water may be lost from the dough by the time it exits from the apparatus, in accordance with out invention the water loss is less than 3 percent and is generally less than 1 percent. This has two significant advantages. First, there is a power savings since there is virtually no demand made by latent heat of evaporation. Secondly, the higher water content in the dough generally yields higher water content in the finished product. The products are not only more tender, they have a much improved shelf life. It is possible to obtain a shelf life increase of 100 to 200 percent over conventionally proofed products in this manner. This is of great importance for many products since many of them have in the past had only 1 or 2 days shelf life making it commercially impossible to market them for wholesale distribution. Products proofed in accordance with our invention, having a longer shelf life, thus have an important advantage over conventionally proofed products.

The relative humidity range above is desirable in most cases. In a few, where a drier skin is necessary, the humidity should be lowered.

It should be noted that if a very strong continuous field is used ("no rest zone, case C" in FIG. 3), the dough must be allowed to rest for a long period after proofing to allow temperature equilibration and full gassing. The dough temperature is raised so fast that gassing is not complete by the time the final proofing temperature is reached. In the case of the weakest continuous field which is not wasteful of time ("no rest zone, case B," in FIG. 3), not only are hot spots not present by the time the final proofing temperature is reached, but the gassing has been completed as well. Thus frying or baking can start immediately. If a continuous field somewhere between the two extreme cases is used ("no rest zone, case A" in FIG. 3), the dough temperature rises to the final proofing temperature in a time somewhere between the two extreme limits. If the field is not too strong, no hot spots are observed. Nevertheless, a rest period must be provided in order to allow complete gassing before frying can begin.

The problem with continuous proofing with a weak field is that it takes relatively long to complete proofing (even though there is a vast improvement over conventional proofing time). One problem with the use of a much higher power density in continuous proofing is that the cost of a microwave oven increases with the power level at which it is operated. The increased cost of the oven may offset the decreased proofing time.

As for continuous proofing at an intermediate power density level, it is often found that unless low levels are used portions of the dough become partially baked. Also, it takes so long for effective gassing to start that the rest period required at the end of the microwave heating to allow the completion of gassing is longer than would be expected.

The two curves which exhibit intermediate rest zones in FIG. 3 are illustrative of the application of the principles of the present invention. The dough temperature is raised to a value (approximately 100° F.) at which substantial gassing can commence. But because of the uneven heating in the dough by the time an average dough temperature of 100° F. is reached, the dough is allowed to remain at 100° F., where its temperature becomes more uniform. Gassing still continues at a relatively rapid rate because the dough is maintained at a temperature which produces rapid gassing. After the period of temperature equilibration (the slower the initial rate of rise of temperature, the longer the rest period), microwave heating commences once again to rapidly finish the proofing and raise the temperature of the dough to the final proofing temperature. Although proofing could be completed simply by allowing the dough to remain in the rest zone for a long enough period, it is much more desirable to finish the proofing rapidly with a second stage of microwave heating. The microwave heating does not begin until sufficient temperature equilibration has been reached such that at the end of the last microwave heating period there will be no hot spots and frying can begin immediately.

It is also possible to provide two rest zones with three microwave heating periods. In such a case, the power density can be slightly higher and the dough temperature rises at a faster rate during the first heating period. The first rest zone is relatively short, however, because the dough temperature is not raised as high as it is during the first heating step in the single rest zone case. During the second heating interval, the dough temperature is raised to a level higher than the rest temperature in the single rest zone case, after which there is a second rest period. During the third microwave heating period, the dough temperature is raised to the final proofing temperature. The rest zone in the single rest zone case is longer than each of the two rest zones in the rest zone case. The reason for this is that in the single rest zone case there is a greater incremental rise in temperature during the first microwave heating period and it takes longer for the temperature of the dough to equilibrate.

In general, the number of rest zones utilized depends on the product mix. For example, in the case of a dough in which temperature "run away" is exhibited, that is, certain portions of the dough can rise very fast in temperature relative to other portions, it is better to raise the average temperature of the dough in relatively short incremental steps, separated by two or more rest zones. An example of such a mix is one which includes a fluid (e.g., jelly) filling.

The use of a moderate power density level together with one or more intermediate rest zones is often better than heating the dough to the final proofing temperature (at the same power density level) and following it with a rest period to allow the completion of proofing. For one thing, temperature runaway is prevented. For another, the total proofing time is less because significant gassing starts earlier due to the initial large incremental rise in temperature.

We have found that it is not absolutely necessary to maintain the average temperature of a dough piece at a constant level during the rest period. It is possible to heat a dough piece during the rest period and to thereby increase its average temperature provided the average temperature of the dough rises at a much slower rate than it does during the heating periods. A rest zone in which the average rate of temperature rise is less than 30 percent of the average rate of temperature rise during the heating periods is satisfactory, although preferably the rate of temperature rise should be no more than 5 percent of the rate of temperature rise during the heating periods. In the field-free zone the temperature of each dough piece equilibrates, thus eliminating hot spots. Further proofing takes place in the rest zone along with the temperature equilibration. The proofing process is facilitated if the dough pieces are heated while they are in the rest zone, although for proper temperature equilibration the rate of rise of the temperature should be within the limits specified above.

Although the invention has been described with reference to particular embodiments, it is to be understood that these embodiments are merely illustrative of the application of the principles of the invention. For example, the rest zone may be open to the air and its temperature maintained at a relatively high value with the use of infrared heating. Also, during the two heating intervals, a single oven or two ovens may be operated at different frequencies and/or different power levels which may be desirable in cases such as jelly-filled doughnuts. This it is to be understood that numerous modifications may be made in the illustrative embodiments of the invention and other arrangements may be devised without departing from the spirit and scope of the invention.

What we claim is:

1. A method for proofing and maturing a yeast-leavened dough comprising the steps of firstly exposing a dough piece to a high-frequency field of an intensity at said dough piece and a duration to elevate the temperature of said dough piece sufficiently to initiate the substantial generation and expansion of gases therein and the partial proofing thereof, secondly exposing said dough piece in a rest zone wherein high-frequency field intensity at said dough piece is less than the field intensity of said first exposure step for a rest period sufficient to permit temperature equilibration of said dough piece, and thirdly exposing said dough piece to a high-frequency field of an intensity at said dough piece and a duration to elevate the temperature of said dough piece sufficiently to substantially complete the proofing thereof.

2. A method in accordance with claim 1 wherein the intensity of the high-frequency field to which a dough piece is exposed during said rest period is sufficiently low to limit the rate of rise of the average temperature of said dough piece to less than 30 percent of the average rate of rise when said dough piece is exposed in said first and third exposure steps.

3. A method in accordance with claim 2 wherein said rest period has a duration sufficient to allow the maximum deviation of the temperature at any point in said dough piece from the average temperature of the dough piece to be less than 20 percent at the end of said rest period.

4. A method in accordance with claim 3 wherein during the first exposure of said dough piece to a high-frequency field its average temperature is caused to rise continuously for 5–180 seconds to a value between 90° and 120° F.

5. A method in accordance with claim 4 wherein said rest period has a duration of 20–180 seconds.

6. A method in accordance with claim 5 wherein during the final exposure of said dough piece to a high-frequency field its average temperature is caused to rise to a final value between 100° and 130° F., in a time period less than 180 seconds.

7. A method in accordance with claim 6 wherein the intensity of said high-frequency field during said rest period is sufficiently low to limit the rate of rise of the average temperature of said dough piece to less than 5 percent of the average rate of rise when said dough piece is exposed in said first and third exposure steps, and said rest period has a duration sufficient to allow the maximum deviation of the temperature at any point in said dough piece from the average temperature of the dough piece to be less than 5 percent at the end of said rest period.

8. A method in accordance with claim 6 wherein when said dough piece is exposed to a high-frequency field in said first and third exposure steps, the power density within the dough piece is controlled to be in the range of 0.089–9.7 watts/g.

9. A method in accordance with claim 6 wherein when said dough piece is exposed to a high-frequency field in said first and third exposure steps, the power density within the dough piece is controlled to be in the range of 0.202–1.08 watts/g.

10. A method in accordance with claim 1 wherein when said dough piece is exposed to a high-frequency field in said first and third exposure steps, the power density within the dough piece is controlled to be in the range of 0.089–9.7 watts/g.

11. A method in accordance with claim 1 wherein when said dough piece is exposed to a high-frequency field in said first and third exposure steps, the power density within the dough piece is controlled to be in the range of 0.203–1.08 watts/g.

12. A method in accordance with claim 1 wherein the intensity of said high-frequency field during said rest period is sufficiently low to limit the rate of rise of the average temperature of said dough piece to less than 30 percent of in average rate of rise when said dough piece is exposed in said first and third exposure steps, and said rest period has a duration sufficient to allow the maximum deviation of the temperature of the dough piece to be less than 20 percent at the end of the said rest period.

13. A method in accordance with claim 12 wherein said steps are performed in an environment in which the ambient temperature is in the range 100°–130° F.

14. A method for proofing and maturing yeast-leavened dough comprising heating a dough piece by exposing said dough piece to a microwave field of an intensity of 0.089–9.7 watts/g. in the dough piece for a total time period sufficient to elevate the temperature of said dough piece to the range of 100°–130° F., for governing the substantial generation and expansion of gases in the dough piece and the proofing thereof, said total time period comprising at least two heating intervals and being interrupted by at least one rest period, between said heating intervals to allow the maximum deviation of the temperature at any point in said dough piece from the average temperature of the dough piece to be reduced to less than 20 percent.

15. A method in accordance with claim 14 wherein said dough piece is exposed during said at least one rest period to a microwave field of an intensity sufficiently low to limit the rate of rise of the average temperature of said dough piece to less than 30 percent of the average rate of rise when said dough piece is exposed to the microwave field having an intensity in said range of 0.089–9.7 watts/g.

16. A method in accordance with claim 15 wherein said at least one rest period is a single rest period having a duration of at least 20 seconds.

17. A method in accordance with claim 16 wherein the field intensity in said dough piece when heated by microwave energy is in the range of 0.202–1.08 watts/g.

18. A method in accordance with claim 17 wherein said method is performed in an environment in which the ambient temperature is in the range of 100°–130° F.

19. A method in accordance with claim 17 wherein said dough comprises wheat flour and between 10 and 250 p.p.m. of a maturing agent based on the weight of the flour.

20. A method in accordance with claim 19 wherein said dough comprises between 1 and 150 p.p.m. potassium bromate based on the weight of said flour and a proteolytic enzyme.

21. A method in accordance with claim 15 herein the field intensity in said dough piece when heated by microwave energy is in the range of 0.202–1.08 watts/g.

21. A method in accordance with claim 21 wherein said method is performed in an environment in which the ambient temperature is in the range of 105°–120° F.

23. A method in accordance with claim 22 wherein said dough comprises wheat flour and between 10 and 250p.p.m., of a maturing agent based on the weight of the flour.

24. A method in accordance with claim 23 wherein said dough comprises between 1 and 150 p.p.m. potassium bromate based on the weight of said flour and a proteolytic enzyme.

25. A method for proofing and maturing a yeast-leavened dough comprising the steps of exposing a dough piece to a microwave field of an intensity and duration to elevate the temperature of said dough piece sufficiently to initiate the generation and expansion of gasses in said dough piece and the partial proofing thereof, substantially discontinuing the exposure of said dough piece to said microwave field for a rest period sufficient to permit temperature equilibration of said dough piece while expansion continues and thereafter exposing said dough piece to a microwave field of an intensity and duration to elevate the temperature of said dough piece sufficient to substantially complete the generation and expansion of gasses in said dough piece and the proofing thereof.

26. A method in accordance with claim 25 wherein the total processing time is less than 9 minutes.

27. A method in accordance with claim 25 wherein the temperature to which said dough piece is raised during said first exposure is less than 120° F.

28. A method in accordance with claim 27 wherein the temperature to which said dough piece is raised during said second exposure is less than 130° F.

29. A method in accordance with claim 28 wherein said rest period is of a duration more than 20 seconds and less than 3 minutes.

30. A method for proofing and maturing a yeast-leavened dough comprising the steps of exposing a dough piece to a microwave field of an intensity and duration to elevate the temperature of said dough piece in a period of less than 180 seconds to at least 90° F., to thereby create conditions within said dough piece for the rapid initiation, generation and expansion of gasses in said dough piece to commence proofing thereof, substantially discontinuing the exposure of said dough piece to said microwave field while only partially proofed for a rest period sufficient to permit temperature equilibration of said dough piece at a temperature less than 120° F., during which rest period said generation and expansion of said gasses continue, and thereafter exposing said dough piece to a microwave field of an intensity and duration to further elevate the temperature thereof to less than 130° F., to substantially complete the generation and expansion of gasses in said dough piece and the proofing thereof.

* * * * *